United States Patent [19]
Brown et al.

[11] 3,759,931
[45] Sept. 18, 1973

[54] NEW MEROCYANINE DYESTUFFS

[75] Inventors: David Sydney Brown; Geoffrey Ernest Ficken; Elizabeth Joan Treherne, all of Ilford, England

[73] Assignee: Ilford Limited, Ilford, England

[22] Filed: Oct. 22, 1971

[21] Appl. No.: 191,797

[30] Foreign Application Priority Data
Oct. 27, 1970 Great Britain.................. 51,031/70

[52] U.S. Cl.......... 260/294.8 D, 96/1.7, 260/240.4, 260/288 R, 260/306 R
[51] Int. Cl............................................ C09b 23/10
[58] Field of Search...................... 260/306 R, 240.4, 260/294.8 D, 288 R

[56] References Cited
UNITED STATES PATENTS
3,403,149  9/1968  Ficken ............................ 260/240.1
FOREIGN PATENTS OR APPLICATIONS
742,112  12/1955  Great Britain.................. 260/240.7
335,580   2/1959  Switzerland..................... 260/306

Primary Examiner—John D. Randolph
Attorney—E. F. Wenderoth et al.

[57] ABSTRACT

New merocyanine dyestuffs of the formula

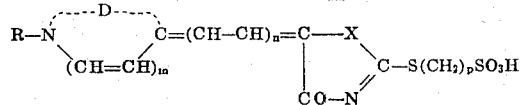

wherein R is alkyl or aralkyl, X is oxygen or sulphur, $m$ is 0 or 1, $n$ is 0 or 1, $p$ is 1 to 4 and D is the residue of a heterocyclic ring, electrophotographic material comprising said dyestuffs as sensitizers and a liquid sensitizer for electrophotographic material are disclosed.

2 Claims, No Drawings

NEW MEROCYANINE DYESTUFFS

This invention relates to novel merocyanine dyes, to their production and to their use for sensitising electrophotographic material.

According to the present invention there is provided a merocyanine dyestuff of the formula I

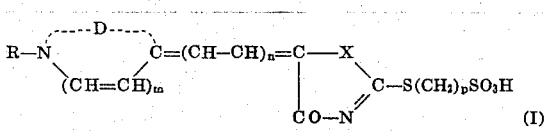

(I)

wherein R is an alkyl or an aralkyl group, X is an oxygen or a sulphur atom, $m$ is 0 or 1, $n$ is 0 or 1, $p$ is 1 to 4 and D is the residue of a heterocyclic ring.

According to another feature of the present invention merocyanine dyestuffs of the above formula I are prepared by heating a merocyanine dyestuff of the formula II

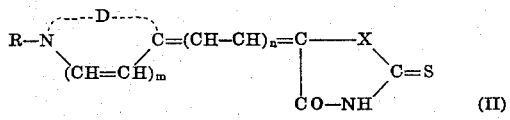

(II)

with an excess of a sultone of the formula III

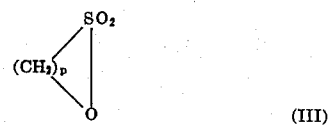

(III)

in which formulae R, X, $m$, $n$, $p$ and D have the meanings assigned to them in formula I.

Merocyanine dyestuffs of the general formula I are of use as sensitizers for electrophotographic material. Electrophotographic material generally comprises a photoconductive layer coated on a support base which has been rendered at least partially electroconductive. Alternatively it comprises a photoconductive layer on an electroconductive layer which is in its turn coated on a support base. One of the most common photoconductive layers comprises zinc oxide particles in an insulating binder. Specially prepared zinc oxide which is photoconductive has to be employed and such zinc oxide is usually ultra-violet light sensitive, the sensitivity extending only a short distance into the visible light region of the spectrum. Colour electrophotographic material using zinc oxide photoconductive layers can be prepared and in this case the surface of the electrophotographic material usually comprises areas which have been selectively sensitized to the blue, green and red regions of the visible spectrum.

Therefore, according to another aspect of the present invention there is provided electrophotographic material which comprises a photoconductive layer which has been sensitized to a region or regions of the visible spectrum to which the photoconductive material is not in itself sensitive by the presence in the photoconductive layer of a merocyanine sensitising dye of the above general formula I.

The photoconductive layer is preferably photoconductive zinc oxide in a binder but it may be an organic photoconductor for example polyvinyl carbazole.

The electrophotographic material of the present invention may be prepared by coating a solution of one of the dyes of the above formula I directly on to the unsensitized photoconductive layer or particles of the photoconductive material, preferably zinc oxide, may have been sensitized by placing them in a solution of one of the above sensitizing dyes and drying and these sensitized particles may then be coated onto the electrophotographic material.

Preferably the electrophotographic material of the present invention is prepared by adding a solution of the dye to the coating mixture which comprises the photoconductive material, insulating binder, if present, and diluent liquid, before the coating mixture is coated onto the support base. When the photoconductive material is zinc oxide the solution of the dye may be added to the zinc oxide before it is mixed with an insulating binder, after it has been mixed with the binder but before dispersion, or it may be added to the coating mixture containing the zinc oxide after dispersion.

Therefore according to another feature of the present invention there is provided a liquid sensitizer for the sensitizing of electrophotographic material which comprises an insulating liquid having suspended therein charged zinc oxide particles, said zinc oxide particles having been dyed with a merocyanine dyestuff of the above formula I.

Liquid sensitizers for the sensitizing of electrophotographic material are described in our co-pending Application No. 94,201, filed Dec. 1, 1970, now abandoned (corresponding to British Application No. 59 825/69).

A particular advantage of a class of merocyanines dyestuffs included within the above general formula I is that they are capable of sensitizing zinc oxide to the blue region of the spectrum.

Therefore, according to this aspect of the present invention there is provided electrophotographic material which comprises a zinc oxide photoconductive layer which has been sensitized to light of the blue region of the spectrum by the presence therein of a merocyanine dyestuff of the formula IV:-

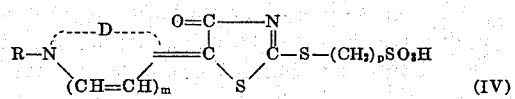

(IV)

where R, D, $m$, and $p$ have the meanings assigned to them in regard to Formula I.

The whole of the surface of the electrophotographic material may be sensitive to blue light by the presence therein of one of the dyes of the above Formula IV or selected regions only of the surface may be sensitive. In the latter case the surface of the photoconductive layer may comprise a mosaic of areas each of which has been selectively sensitized to one of the regions of the spectrum, blue, green and red.

The following Examples will serve to illustrate the invention. The temperatures are given therein in degrees centigrade.

EXAMPLE 1

5-(1',4'-Dihydro-1'-methyl-4'-pyridylidene)-2-(3''-sulphopropylthio)-2-thiazolin-4-one.

A mixture of 5-(1',4'-dihydro-1'-methyl-4'-pyridylidene)-rhodanine (0.5 g) and 1,3-propanesultone (0.5 ml) was heated at 140° for 2 hours. The resulting product was cooled, ground with acetone, and the solid was filtered off, washed with acetone, dried and crystallised from water. The resulting dye had m.p. 307–309° (decomposition); the absorption maximum in methanol was 450 nm (log $\epsilon$ 4.67).

EXAMPLE 2

5-(1'-Ethyl-1',4'-dihydro-4'-pyridylidene)-2-(3''-sulphopropylthio)-2-thiazolin-4-one.

The dye was prepared as in Example 1 from 5-(1'-ethyl-1',4'-dihydro-4'-pyridylidene)-rhodanine, and had m.p. 286° (decomp.) after crystallisation from water. The absorption maximum in methanol was 451 nm (log $\epsilon$ 4.67).

EXAMPLE 3

5-(3'-Ethyl-2'-benzothiazolinylidene)-ethylidene-2-(3''-sulphopropylthio)-2-thiazolin-4-one.

The dye was prepared as in Example 1, heating 5-(3'-ethyl-2'-benzothiazolinylidene)-ethylidenerhodanine with 1,3-propanesultone for 10 minutes. It was purified by washing with a little water, and had m.p. 259°–266°; the asborption maxima in water were 539 nm (log$\epsilon$, 4.75) and 508 nm (log $\epsilon$, 4.66).

EXAMPLE 4

5-(3'-Ethyl-2'-benzoxazolidinylidene)-ethylidene-2-(3''-sulphopropylthio)-2-thiazolin-4-one.

The dye was prepared and purified as in Example 3; it had m.p. 291°–296°, and the absorption maxima in water were 506 nm (log $\epsilon$, 4.72) and 483 nm (log $\epsilon$, 4.62).

EXAMPLE 5

5-(1'-Ethyl-5',5'-dimethyl-2'-pyrrolidinylidene)-ethylidene-2-(3''-sulphopropylthio)-2-thiazolin-4-one.

A mixture of 5-(1'-ethyl-5',5'-dimethyl-2'-pyrrolidinylidene)-ethylidenerhodanine (0.5 g) and 1,3-propanesultone (0.5 ml) was heated at 140° for 1 hour. The cooled product was stirred with acetone, the acetone was poured off, and this process repeated several times on the residue. The dye was thereby obtained as a sticky, hygroscopic solid; the absorption maximum in water was 440 nm.

EXAMPLE 6

5-(3'-Methyl-2'-thiazolidinylidene)-ethylidene-2-(3''-sulphopropylthio)-2-thiazolin-4-one.

The dye was prepared as in Example 5. The absorption maximum in water was 460 nm.

EXAMPLE 7

5-(3'-Methyl-2'-benzothiazolinylidene)-2-(3''-sulphopropylthio)-2-thiazolin-4-one.

The dye was prepared as in Example 5. The absorption maximum in water was 412 nm.

EXAMPLE 8

5-(1',5'-Dimethyl-2'-pyrrolidinylidene)-ethylidene-2-(3''-sulphopropylthio)-2-oxazolin-4-one.

A mixture of 5-(1',5'-dimethyl-2'-pyrrolidinylidene)-ethylidene-2-thio-2,4-oxazolidenedione (0.5 g) and 1,3-propanesultone (0.6 ml) was heated at 115° for 30 minutes. The cooled product was washed with several portions of cold ethyl acetate, to leave the dye as a sticky, hygroscopic solid. The absorption maximum in water was 418 nm.

EXAMPLE 9

5-(1',4',4'-Trimethyl-2'-pyrrolidinylidene)-ethylidene-2-(3''sulphopropylthio)-2-oxazolin-4-one.

The dye was prepared as in Example 8. The absorption maximum in water was 418 nm.

EXAMPLE 10

5-(1'-Ethyl-3'-methylbenzimidazolinylidene)-2-(3''-sul-phopropylthio)-2-thiazolin-4-one.

A mixture of 1,3-propanesultone (0.24 g) and 5-(1'-ethyl-3'-methylbenzimidazolinylidene)-rhodanine (0.30 g) was heated at 120° for 2½ hours. After cooling the product was triturated several times with dry ether and acetone to yield a hygroscopic dye; the absorption maximum in methanol was 387 nm (log $\epsilon$, 4.04).

EXAMPLE 11

5-(1',2'-Dihydro-1'-methyl-2'-quinolylidene)-2-(3''-sulphopropylthio)-2-thiazolin-4-one.

The dye was prepared by heating 5-(1'-methyl-2'-quinolylidene)-rhodanine (0.82 g) with 1,3-propanesultone (1.1 g) at 140° for 1½ hours. The reaction product was purified, as described in Example 10, and the hygroscopic dye had an absorption maximum in methanol at 450 nm (log $\epsilon$, 4.10).

EXAMPLE 12

5-(1'-Ethyl-3'-methylbenzimidazolinylidene)-2-(4''-sulpho-butylthio)-2-thiazolin-4-one.

A mixture of 5-(1'-ethyl-3'-methylbenzimidazolinylidene)-rhodanine (0.20 g) and 1,4-butanesultone (0.36 g) were heated at 140° for 2 hours. After purification of the hygroscopic dye, as in Example 10, it had absorption maximum in methanol 390 nm (log $\epsilon$, 4.10).

EXAMPLE 13

5-(1'-Ethyl-1',4'-dihydro-4'-pyridylidene)-2-(4''-sulphobutylthio)-2-thiazolin-4-one.

The dye was prepared, as in Example 12, heating 5-(1'-ethyl-1',4'-dihydro-4'-pyridylidene)-rhodanine (0.5 g) with 1,4-butanesultone (1.80 g) for 4 hours. It was purified as in Example 10 and had m.p. 265°; the absorption maximum in methanol was 453 nm (log $\epsilon$, 4.65).

EXAMPLE 14

The following coating mixture was prepared:

| | |
|---|---|
| Fotofax zinc oxide (ex Imperial Smelting Co.) | 30 g |
| E87-09 resin (ex Cray Valley Products) | 4.2 g |
| Toluene | 20 ml. |

This coating mixture was ball-milled for five hours and then diluted with 15 ml toluene. 0.01 g of the dye of Example 2 was dissolved in 10 ml methanol and was added with stirring to the diluted coating mixture using a Silverson stirrer. When the dye had been thoroughly dispersed in the coating mixture, the coating mixture was coated on to an electroconductive paper base. A similar photoconductive coating was prepared and coated on to an electroconductive paper base except that the above mentioned pyridylidene dye of Example 2 was not added. A wedge spectrogram of each material was then prepared. These spectrograms are shown in the accompanying figure. The unsensitised electrophotographic material is light-sensitive in the ultraviolet region of the spectrum but its sensitivity extends just into the blue region of the spectrum, the blue region commencing at 420 nm. On the other hand the blue-sensitised material is also sensitive in the ultra-violet region of the spectrum but the sensitivity has in this case been extended to 470 nm. However the material has not been made sensitive to the green region of the spectrum, the green region commencing at 510 nm.

EXAMPLE 15

Further samples of electrophotographic material were prepared in a similar manner to those of Example 10 except that instead of the dye of Example 2 being used the dyes of the following Examples were used, Examples 3, 4 and 7 one dye to each sample of material.

A wedge spectrogram of each material was then prepared.

In the material which contained the dye of Example 3 the sensitivity had been extended to 610 nm with a maximum at 540 nm. The material had thus been sensitised to green light.

In the material which contained the dye of Example 4 the sensitivity had been extended to 550 nm with a maximum at 510 nm. The material had thus been sensitised so that its sensitivity extended part way into the green region of the spectrum.

In the material which contained the dye of Example 7 the sensitivity had been extended to 460 nm with a maximum at 425 nm. The material had thus been sensitised well into the blue region of the spectrum but had not been made sensitive to the green region of the spectrum.

We claim:

1. A merocyanine dyestuff of the formula

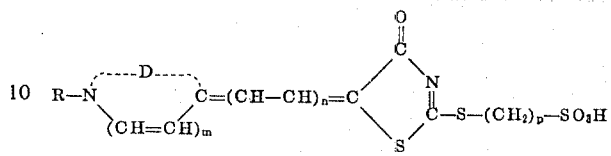

wherein R represents a methyl or ethyl group, m is 0 or 1, n is 0 or 1, p is 3 or 4 and D represents the residue of a heterocyclic ring selected from the group consisting of
a dihydropyridine ring,
a benzothiazolidine ring,
a benzoxazolidine ring,
a pyrrolidine ring,
a thiazolidine ring,
a benzimidazolidine ring and
a dihydroquinoline ring.

2. A merocyanine dyestuff according to claim 1 of the formula

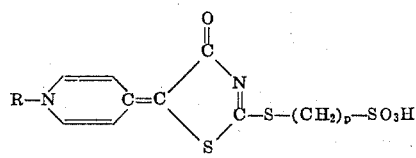

wherein R represents a methyl or ethyl group and p is 3 or 4.

* * * * *